A. M. ALLEN.
DOUBLE GEARED VELOCIPEDE.
APPLICATION FILED FEB. 15, 1915.

1,149,422.

Patented Aug. 10, 1915.

Witnesses:

Inventor:
Arthur M. Allen

UNITED STATES PATENT OFFICE.

ARTHUR MOFFAT ALLEN, OF NEW BRIGHTON, NEW YORK.

DOUBLE-GEARED VELOCIPEDE.

1,149,422.  Specification of Letters Patent.  Patented Aug. 10, 1915.

Application filed February 15, 1915. Serial No. 8,280½.

*To all whom it may concern:*

Be it known that I, ARTHUR M. ALLEN, a citizen of the United States, and resident of New Brighton, in the county of Richmond and State of New York, have invented certain new and useful Improvements in Double-Geared Velocipedes, of which the following is a specification.

My invention relates to improvements in the driving gear of velocipedes and consists of the old ordinary velocipede, whose front wheel foot cranks serve for low speed driving gear, and separate high speed driving gear arranged above the front wheel, as far from the seat as the low gear cranks, and having an operating connection to one of the road wheels, whereby the rider has immediate alternate use of either gear as the grade may require. This high gear is mounted in an extension of the frame beyond the fork, and drives the rear wheel, but the extension may be in the fork and the connection made to the front wheel in which case the chain is shorter. The low gear here is 28, and the high gear may be 120 or more, which two extremes are ample for all possible grade conditions and provide the rider with ease and comfort going up hills.

I attain these objects by mechanism illustrated in the accompanying drawings in which—

Figure 1:
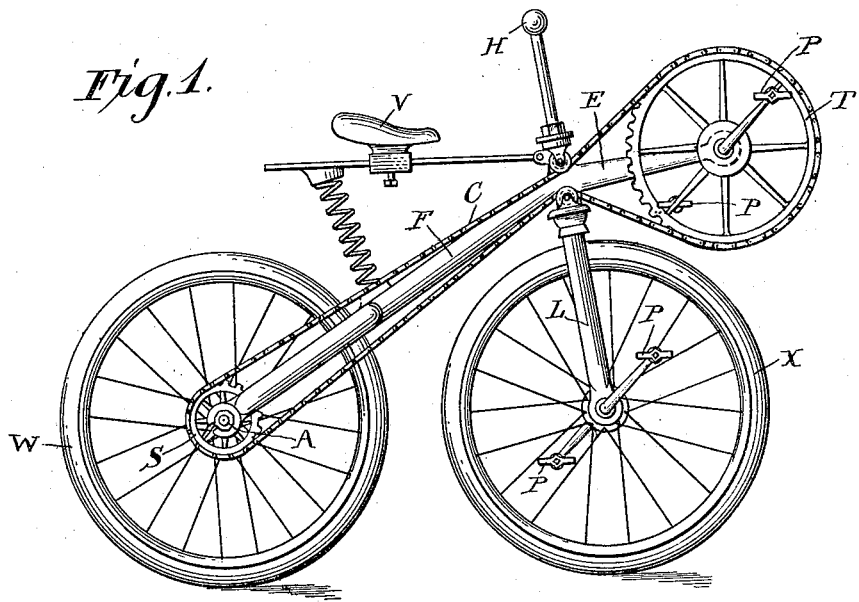
Figure 2:
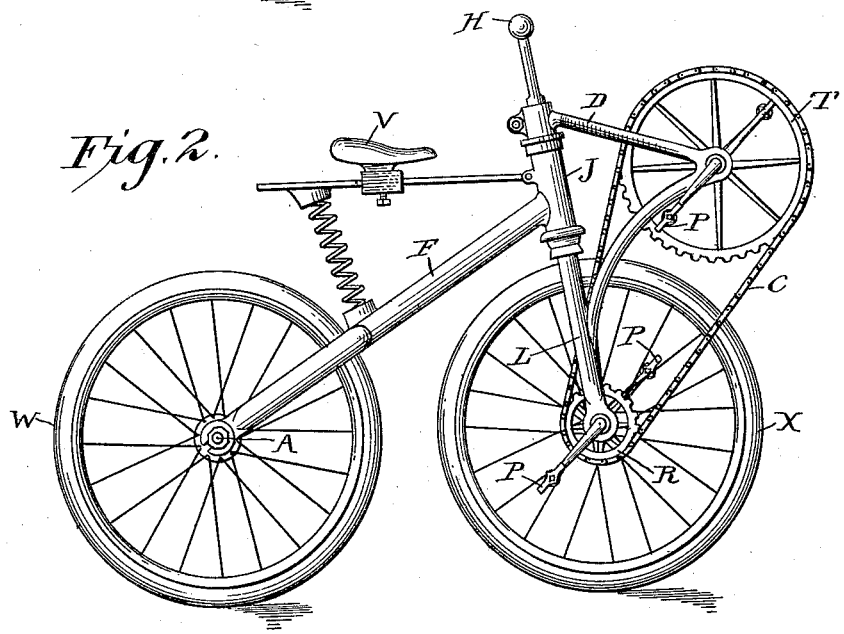

Figure 1 is a side elevation of the invention. Fig. 2 is a side elevation of a modification of the same.

Similar letters refer to similar parts throughout the several views.

In the drawings, two road wheels W and X are mounted in frame F and fork L. In an extension E of frame F is mounted a sprocket wheel T, with pedals P. A chain C connects sprocket T to sprocket S on rear wheel axle A, thereby providing the high speed gearing for the rider in seat V. For low speed the rider uses the pedals P mounted on the front wheel axle.

Fig. 2 shows a modification in which the front sprocket wheel T is geared to the front wheel, instead of the rear wheel. The sprocket wheel T is mounted in the bracket D extending forwardly from the fork L, and a sprocket chain C connects the same to a sprocket wheel R fast on the shaft of the front wheel.

What I claim as new, and am desirous of securing by Letters Patent is:

1. In a wheeled vehicle, a road wheel mounted in a fork, and propelled by foot cranks on the axle thereof for low speed, in combination with high speed driving gear, arranged above said road wheel and beyond the fork, and operating a driving connection to one of the road wheels.

2. A velocipede, whose front wheel is driven by foot cranks on the axle thereof for low speed, in combination with high speed foot driving gear, arranged above said road wheel and beyond the fork, an operating connection to the rear road wheel, and one seat.

3. A velocipede driven by foot cranks on the front wheel for low gear, in combination with a high speed foot driven sprocket wheel, mounted in an extension of the frame, over the front road wheel and beyond the fork, another sprocket on the rear road wheel, and a chain connecting the sprockets.

4. In a wheel vehicle, a road wheel propelled by foot cranks on the front wheel axle for low speed, in combination with high speed sprocket foot driven gearing, arranged above said road wheel and beyond the fork, and a chain connection to one of the road wheels, for alternate use of the rider.

5. In a wheeled vehicle, a fork supported by a front road wheel, a high speed foot driving gear mounted in an extension of the frame beyond the fork above the front wheel, all in combination with independent low speed foot driving gear, and operating connections to the road wheels, for the alternate use of one rider.

Signed at New Brighton in the county of Richmond and State of New York this 28th day of January A. D. 1915.

ARTHUR MOFFAT ALLEN.

Witnesses:
JOSEPH G. UTTER,
ANDREW MEYER.

Copies of this patent may be obtained for five cents each, by addressing the "Commissioner of Patents, Washington, D. C."